March 23, 1954
J. G. CAPSTAFF
2,672,786
MOTION-PICTURE REGISTER GAUGE
Filed Nov. 24, 1951
2 Sheets-Sheet 1
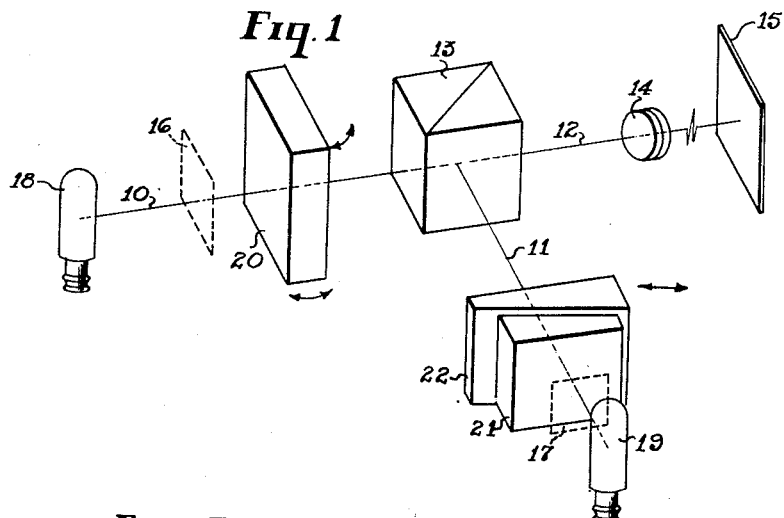
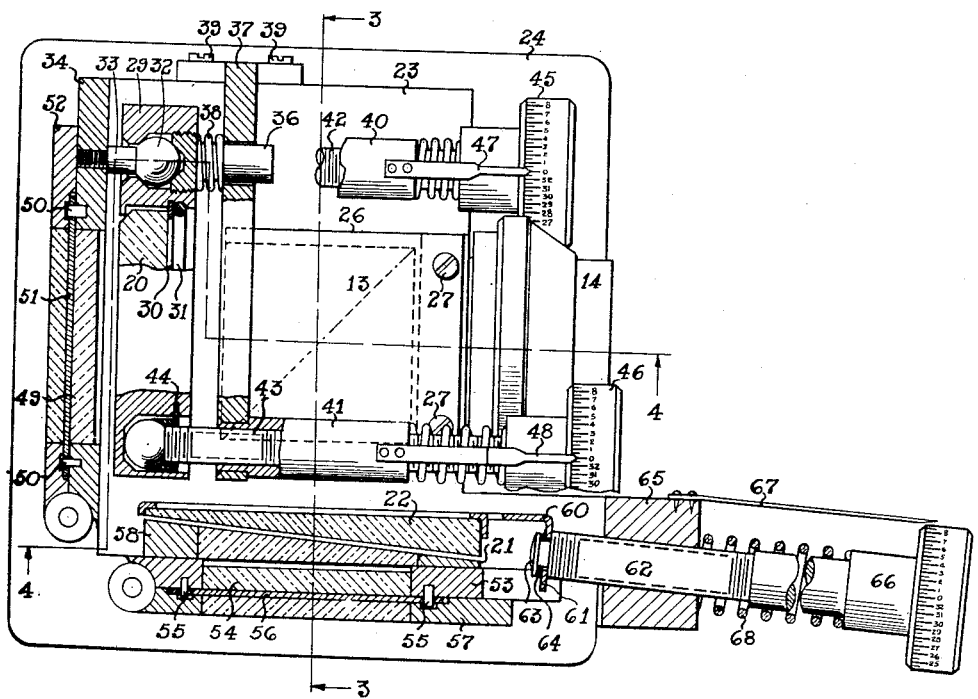
JOHN G. CAPSTAFF
INVENTOR.
BY Daniel J. Mayne
ATTORNEYS March 23, 1954
J. G. CAPSTAFF
2,672,786
MOTION-PICTURE REGISTER GAUGE
Filed Nov. 24, 1951
2 Sheets—Sheet 2
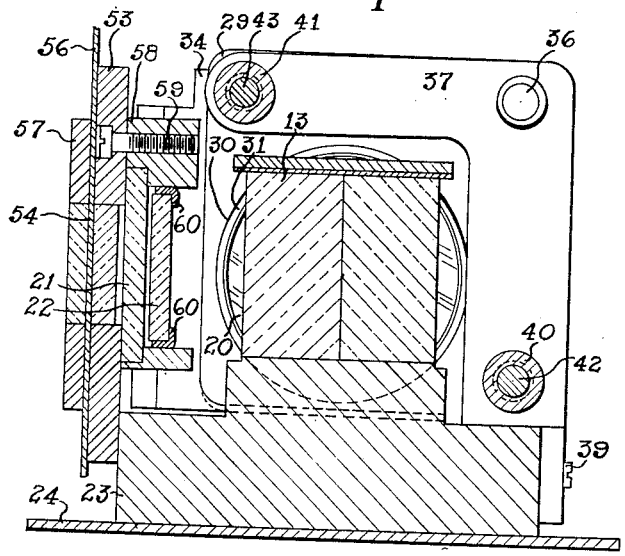
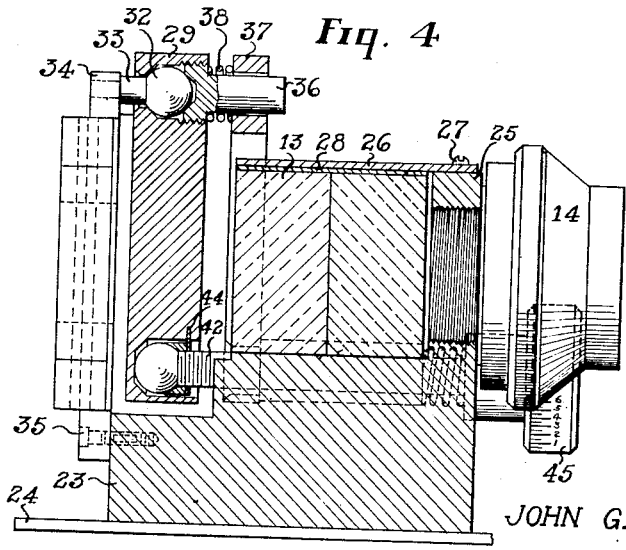
JOHN G. CAPSTAFF
INVENTOR.
BY *Daniel J. Mayne*
*Holla N. Carter*
ATTORNEYS Patented Mar. 23, 1954

2,672,786

UNITED STATES PATENT OFFICE 2,672,786

MOTION-PICTURE REGISTER GAUGE

John G. Capstaff, Rochester, N. Y., assignor to Eastman Kodak Company, Rochester, N. Y., a corporation of New Jersey Application November 24, 1951, Serial No. 258,070

3 Claims. (Cl. 88—14)

The present invention relates to apparatus for checking the relationship between images on separate, perforated motion picture film strips and their respective perforations, and, more particularly, to apparatus for checking the accuracy of the registration of separation images with their sprocket perforations on different films.

In the production of motion picture film in color, it is customary to make two or more series of color separation images from which are obtained, by printing, master positives and dupe negatives with which release prints are made. The original color separation films and the release prints, as well as the intermediate prints, may be made in any well-known manner, but, however made, there is usually present the problem of securing in the release print the accurate registry of the several images required for satisfactory color reproduction.

The most practical way to obtain the desired registry is to have the complemental images on the several master films, from which the release prints are to be made, bear exactly the same relation to their respective sprocket perforations. This can be accomplished by the use of the register gage of the present invention to determine the necessary corrections which must be introduced in printing the master films to compensate for the various errors which are bound to exist due to differences in shrinkage and the like of different films exposed and processed at different times and under different circumstances.

In accordance with the invention, corresponding frames of color separation images on separate films are positioned on accurately formed register pins which hold the perforations in predetermined positions where the accompanying frames are projected in superposed relation by suitable optical systems, preferably a branched system with the frames held in different branches. One of the branches is provided with a plane parallel plate tiltable in two orthogonal planes for shifting in two directions in its own plane the projected image of the frame in that branch, the amount and direction of the tilts required to produce exact registry of the two projected images being a measure of the difference between the register of the two frames with their respective perforations. The other branch of the optical system may be provided with an optical element movable to vary the magnification for bringing to the same size the two superposed images. In each case, the adjustment required is a measure of the adjustment needed in printing.

The invention will be readily understood from the following description when read in connection with the accompanying drawings, in which:

Fig. 1 is a diagrammatic view in perspective of the optical portion of a gage constructed according to the invention;

Fig. 2 is a top view partly in section of a complete gage;

Fig. 3 is a sectional view along the line 3—3 in Fig. 2; and

Fig. 4 is a sectional view along the line 4—4 in Fig. 2.

The optics of the gage according to the preferred embodiment of the invention are shown in Fig. 1 as comprising two optical paths or branches 10 and 11 which are merged into a single path 12 by a beam splitter 13. A projection objective 14 is positioned in the path 12 to have an image plane on a suitable screen 15 and object planes 16 and 17 located, respectively, in the branch paths 10 and 11 so that objects, such as motion picture frames, positioned at 16 and 17 will be imaged in superposition on the screen 15. Suitable light sources 18 and 19 furnish illumination for the object planes 16 and 17, respectively. For shifting one of the superposed images in the plane of the screen 15 for the purpose of bringing the two images into register, a parallel plate, or optical flat, 20 is placed between the object plane 16 and the beam splitter 13 and so mounted that it can be tilted in each of two planes normal to each other and parallel to the optic axis 10, as indicated by the double arrows. As is well understood, tilting the plate 20 shifts the virtual image of the object plane 16 as viewed by the objective 14 and this, of course, results in a corresponding shift of the projected image on the screen 15.

In order to check difference in size between two frames in the object planes 16 and 17, the other optical branch 11 is provided with a zero-power compound prism formed with two wedges 21 and 22 whose combined optical thickness is equal to the optical thickness of the plate 20 when the wedges 21 and 22 are centered, as shown in Fig. 1. If one wedge, such as the wedge 22, is moved in either direction, as indicated by arrows, the effective optical thickness of the compound prism is varied which results in a change in the size of the image of the object plane 17 on the screen 15, as is well known.

An apparatus incorporating the optical system of Fig. 1 (except for the lamps 18 and 19 and the screen 15) is shown in Figs. 2, 3 and 4 as comprising a structure having a base 23 and a base plate 24 to facilitate securing the gage to a table or bench. The base 23 has a platform 24 upon which the beam splitter 13 sets and an upright wall 25 (see Fig. 4) which may be integral with the base 23. The wall 25 is provided with a threaded aperture in which the projection objective 14 is mounted, the beam splitter 13 being oriented so that its exit surface faces the apertured wall 25 and, hence, faces the objective 14. The beam splitter 13 may be held in position on the base 23 by a cap member 26 suitably secured to the wall 25 as by screws 27. The cap member 26 preferably has a cork or similar underlayer 28 for engaging the top surface of the beam splitter 13.

The tiltable plate 20 is, for structural convenience, made circular and mounted in a thick, apertured plate 29 by suitable retaining rings 30 and 31. The thick plate 29 is pivotally suspended on the ball-shaped end 32 of a stud 33 carried by a plate 34 secured to the base 23 by screws 35. The ball end 32 is countersunk in the plate 29 and held therein by the concave end of a rod 36 which may extend freely through an aperture in a yoke member 37 with sufficient clearance to permit the small amount of tilting required for the plate 20 to function. A spring 38 under compression may be provided between the plate 29 and the yoke 37 to prevent play or backlash in the pivot.

The yoke 37 is an L-shaped member rigidly secured to the base 23 by screws 39 and extending along the margin of adjacent edges of the plate 29. Near the two ends of the yoke 37 are secured internally threaded tubes 40 and 41 through which extend in threaded engagement adjusting screws 42 and 43, respectively, having ball ends pivotally anchored by leaf springs 44 in suitable recesses formed in the plate 29. The free ends of the adjusting screws 42 and 43 are provided with suitable knobs 45 and 46, respectively, having scale markings which cooperate with stationary pointers 47 and 48, respectively, to indicate their positions. It will be apparent that if the knob 45, and hence the screw 42, is rotated, the plate 29 will be tilted about an axis extending through the centers of the pivot ball 32 and the ball end of the screw 43. Similarly, rotation of the screw 43, by turning the knob 46, will tilt the plate 29 about an axis extending through the centers of the pivot ball 32 and the ball end of the screw 42.

The stationary plate 34 has a glass projection window 49 alined with the tiltable plate 20 and carries register pins 50 for engaging perforations in a motion picture film strip 51. For holding the film 51 plane a hinged cover plate 52 may be provided. It will be understood that the film 51 will be positioned with its emulsion side against the window 49 and that this position corresponds to the object plane 16 of Fig. 1. On the lower edge of the base 23, as viewed in Fig. 2, is mounted another plate 53, similar to plate 34, having a glass projection window 54, register pins 55 for engaging perforations in a motion picture film strip 56 and a hinged cover plate 57. The film strip 56 is located so as to occupy the position corresponding to the object plane 17 indicated in Fig. 1.

A frame member 58 secured to the rear face of the projection window plate 53 by a screw 59 holds the stationary wedge 21 in alinement with the window 54 and the beam splitter 13. The other wedge 22 is mounted in a suitable frame 60 having a bent-over ear 61 by which it is secured to the end of a threaded rod 62 by means of a machine screw 63. A spring washer 64 is placed between the head of the screw 63 and the ear 61 to permit rotation of the rod 62. The top and bottom portions of the frame 60 engage in slidsing relation the milled inner faces of the member 58 to prevent rotation of the frame 60. The rod 62 is threaded through a boss 65 in a direction parallel to the inner faces of the wedges 21 and 22 and perpendicular to the wedging angle of the wedge 22. The boss 65 may be formed integral with the frame member 58 to assure the proper relationship between the rod 62 and the wedge 22. The rod 62 is provided with a knob 66 which may be rotated to move the wedge 22 back and forth as necessary to match the magnifications of the projected images as described in connection with Fig. 1. A pointer 67 cooperates with suitable scale markings on the knob 66 to indicate the position of the wedge 22 and the adjustment needed in the printer. A spring 68 under compression between the boss 65 and the knob 66 serves to hold the same thread faces in engagement to prevent lengthwise play.

If the color separation films are obtained by stripping exposed multilayer film, such as described in my Patent Number 2,533,424, it is generally desirable to consider as normal the emulsion layer which remains on the original base, e. g., the one representative of the color red. The red separation film strip may be placed on the register pins 50 with a certain frame at the projection window 49 and the film strip of another color aspect, say green, placed on the register pins 55 with the corresponding frame at the projection window 54. The knobs 45, 46 and 66 are then adjusted until the superposed images on the screen 15 are exactly in register and of the same size. By using projection light beams complementary in color, the operator can make the required adjustments quicker and with greater accuracy. The adjustments found necessary are noted from the end positions of the several knobs 45, 46 and 66 for use in adjusting the printer when printing the "green" film strip. Without disturbing the "red" strip at the window 49, the "green" strip is removed and the "blue" strip placed on the register pins 55 with its corresponding frame at the projection window 54. The several knobs 45, 46 and 66 are again adjusted to produce exact registration of the superposed images, the adjustments required being noted for use in printing the "blue" film strip.

While for the purpose of illustrating the invention, a specific embodiment thereof has been described in detail, it is to be understood that the invention is not limited thereto, but is of the scope of the appended claims.

What I claim as new and desire to secure by Letters Patent of the United States is:

1. Apparatus for determining the relationship between images on separate perforated motion picture film strips and their respective perforations comprising two projection windows each of which is provided with accurately formed register pins for holding in predetermined positions the perforations of film strips at the projection windows, optical means for projecting images of film strips in the two windows in superposition on a viewing screen, and between one of the windows and said optical means an optical flat universally pivotally mounted at one point and independently tiltable in orthogonal planes perpendicular to the plane of the optical flat.

2. Apparatus for determining the relationship between color separation images of the same view on separate perforated motion picture film strips, and their respective perforations comprising an optical system having two branches defining a branched optical path, means in each branch of the optical system for holding a film strip with its perforations in identical positional relationship with respect to the optical path, means in the optical system for imaging in superposition the color separation images on film strips held in the two branches of the optical system, an optical flat tiltable in one of said branches for shifting one of the superposed images in the image plane and means for indicating the magnitude and direction of the tilt of the optical flat required to produce exact registry of the superposed images.

3. The apparatus defined in claim 2 in which in the other of said branches of the optical system is positioned a zero-power compound prism one component of which is movable to vary the thickness of the glass path and hence the magnification of the image on the film strip held in said other of said branches, and means for indicating the magnitude and direction of movement of said one component required to bring the two superposed images to exactly the same size.

JOHN G. CAPSTAFF.

References Cited in the file of this patent

UNITED STATES PATENTS

| Number | Name | Date |
| --- | --- | --- |
| 1,580,115 | Brewster | Apr. 13, 1926 |
| 2,155,075 | Adam | Apr. 18, 1939 |
| 2,382,580 | Rackett | Aug. 14, 1945 |